Figure 1:
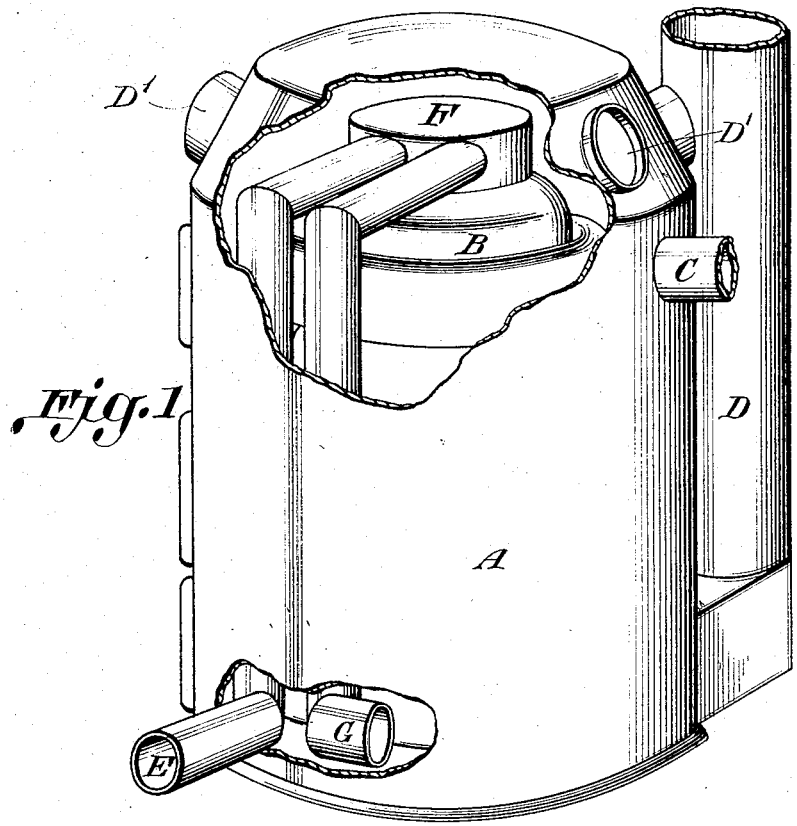

Sept. 3, 1929.  F. H. WOOD  1,726,727
FRESH AIR HEATER FOR WARM AIR FURNACES
Filed Sept. 5, 1928

Frederick H. Wood.
INVENTOR

Patented Sept. 3, 1929.

1,726,727

UNITED STATES PATENT OFFICE.

FREDERICK H. WOOD, OF CHICAGO, ILLINOIS.

FRESH-AIR HEATER FOR WARM-AIR FURNACES.

Application filed September 5, 1928. Serial No. 305,059.

The object and nature of this invention is to provide a practical means of pre-warming fresh out of door air separately within the casing of a warm air furnace before mingling it within said casing with the current of air returned to the furnace from the rooms of the house, or before passing it direct to the rooms.

The means I have designed consists of an inclosure seated on the dome of the furnace heater and within the casing of the furnace, with a duct leading from the exterior air to said inclosure, and a duct leading from said inclosure for the distribution of the pre-warmed fresh air after it has passed through said inclosure.

It is not practical within the casing or jacket of a warm air furnace to mingle cold fresh, exterior air with the recirculating current of air from the rooms of a dwelling, because the fresh air being of a much lower temperature than the recirculating air interferes with the desired circulation of air through the furnace.

It becomes necessary to warm the fresh air to a degree equal to that of the recirculating air when returned to the furnace before the two currents are mingled.

The difficulty of forming a separate compartment within the casing of the furnace wherein the fresh air can come in close contact with the heating surfaces of the furnace heater has been, that the contour of the sides of a furnace heater varies in each size or make of furnace. It is desirable that the fresh air which passes rapidly be given the greatest amount of heat in the least possible space. I have for this reason adopted a fresh air casing to be located on the top surface of the furnace heater.

The top surface of a furnace heater is usually flat or oval, forming a dome. The circumference of such domes is usually circular in shape, and the casing of the fresh air heater of my design terminates at its base peferably in a circular rim open at the bottom in order that the top surface of the furnace heater may close this opening and the fresh air passing through the heater provided may come directly in contact with the surface of the heater of the furnace.

A certain amount of warmth could be conveyed to the casing of an enclosed heater for fresh air located above or on the dome of the furnace heater, but I prefer that the fresh air shall circulate in direct contact with the heating surface of the dome.

One of the principal purposes of this invention is not only to provide a practical fresh air heater but one which can be adaptable almost universally with furnace heaters of various sizes and makes, in order to create a commercial article.

I prefer also to interpose partitions or baffles within the casing of the fresh air heater to direct the air circuitously through the heater and against the heating surfaces.

Air ducts are provided to convey the fresh air through the casing of the furnace to within the fresh air heater, and from thence either to the base of the furnace heater to mingle with the recirculating air, or directly to the rooms of the dwelling.

Having stated the purpose of my invention, the nature of which will be fully understood from the description I give below when considered in connection with the drawing in which the same letter denotes similar parts in each figure, Figure 1 of the drawing represents an ordinary warm air furnace, the casing of the furnace being cut away disclosing the interior and the location of the fresh air heater with ducts leading to and from the fresh air heater.

Figure 2:
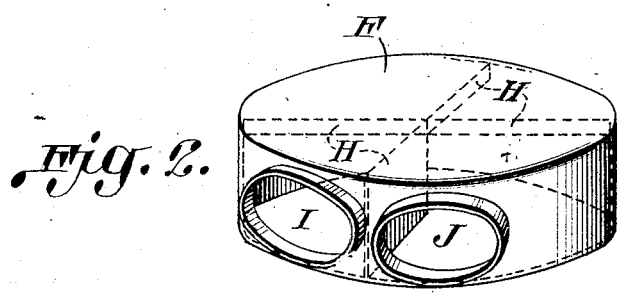

Figure 2 represents the fresh air heater, the dotted lines indicating baffles located within the casing of the fresh air heater.

In Figure 1 A represents the casing of the furnace, B the heater of the furnace, C the smoke pipe leading to a chimney flue, $D^1$ are hot-air ducts leading to rooms, D is a duct for the return air from the rooms. E is a fresh, exterior air duct leading from a point without the casing of the furnace to the fresh air heater. F is the casing of the fresh air heater located on the dome of the furnace heater B, and forming an inclosure for the current of fresh air while said air is being heated. G is a duct leading from the fresh air heater F to a point at the base of the heater B, having an opening at its extremity within the casing of the furnace.

In Figure 2, F represents the casing which forms the fresh air heater, closed at top and sides but open at the bottom and having an opening I for the intake of the fresh air current, and an opening J for the exit of the warmed fresh air current. The baffles within the casing of the fresh air heater F are indicated by the letters H and are designed to cause the air current to circulate properly through the heater F.

The casing F with its openings I and J may be formed from sheet metal, but I prefer to have it comprised of cast iron in one single casting and open at the bottom for the reasons stated.

Figure 1 indicates one manner in which the fresh air current may be made to circulate through the heater F and mingle with the recirculating current, but it is evident that the duct E could enter the casing of the furnace at some other point such as through the upper portion of the furnace casing A, or that the duct G could pass through the jacket and lead directly to the rooms, or that the openings I and J of the casing F could be placed opposite each other or at any desired point, but in the matter of utilizing the fresh air heater F, I believe the manner indicated in Figure 1 is preferable because there is usually a pressure of the exterior air current which requires baffling or checking, the expansion of the air within the casing A due to heat, causing it to rise in circulation and on entering the rooms of a house it escapes in attic or other means of exit such as fireplaces or ventilating ducts connecting with the chimney flue, and the air so passing from the house has to be replaced with exterior air which will naturally enter through the fresh air duct E.

The passage of the fresh air through the heater F will therefore be somewhat rapid and need not attain a temperature greater than that of the recirculating air from the rooms at the point of entrance to within the casing of the furnace.

I claim:—

1. A furnace having heating means, a casing surrounding the heating means and spaced therefrom, one or more ducts communicating with the rooms and with the upper portion of the space between the casing and the heating means, means for the return of air from the rooms to the lower portion of said space, an inclosure within said space between the heating means and the casing seated on the upper portion of the said heating means, a duct communicating with the said inclosure and with the exterior air, and a second duct leading from said inclosure for the distribution of the warmed fresh air.

2. A furnace having heating means, a casing surrounding the heating means and spaced therefrom, one or more ducts communicating with the rooms and with the upper portion of the space between the casing and the heating means, means for the return of air from the rooms to the lower portion of said space, an inclosure within said space between the heating means and the casing seated on the upper portion of the said heating means, a duct communicating with the said inclosure and with the exterior air, and a second duct leading from the said inclosure for the distribution of the warmed fresh air, the surface of the upper portion of the said heating means forming part of the walls of said inclosure.

3. A furnace having heating means, a casing surrounding the heating means and spaced therefrom, one or more ducts communicating with the rooms and with the upper portion of the space between the casing and the heating means, means for the return of air from the rooms to the lower portion of said space, an inclosure within said space between the heating means and the casing seated on the upper portion of the said heating means, a duct communicating with the said inclosure and with the exterior air, and a second duct leading from said inclosure for the distribution of the warmed fresh air, the said inclosure being open at the bottom, the surface of the upper portion of the said heating means closing said opening.

4. A furnace having heating means, a casing surrounding the heating means and spaced therefrom, one or more ducts communicating with the rooms and with the upper portion of the space between the casing and the heating means, means for the return of air from the rooms to the lower portion of said space, an inclosure within said space between the heating means and the casing seated on the upper portion of the said heating means, a duct communicating with the said inclosure and with the exterior air, and a second duct leading from said inclosure for the distribution of the warmed fresh air, the said inclosure being open at the bottom, the surface of the upper portion of the said heating means closing said opening, the base of said inclosure surrounding said opening being circular in form.

5. A furnace having heating means, a casing surrounding the heating means and spaced therefrom, one or more ducts communicating with the rooms and with the upper portion of the space between the casing and the heating means, means for the return of air from the rooms to the lower portion of said space, an inclosure within said space between the heating means and the casing seated on the upper portion of the said heating means, a duct communicating with the said inclosure and with the exterior air, a second duct leading from said inclosure for the distribution of the warmed fresh air, and baffles within the inclosure to direct the flow of the current of fresh air.

FREDERICK H. WOOD.